Jan. 9, 1951     H. M. FINCH     2,537,041
HYDRAULIC JACK SUSPENDED TIRE REMOVER
Filed May 21, 1946     2 Sheets-Sheet 1
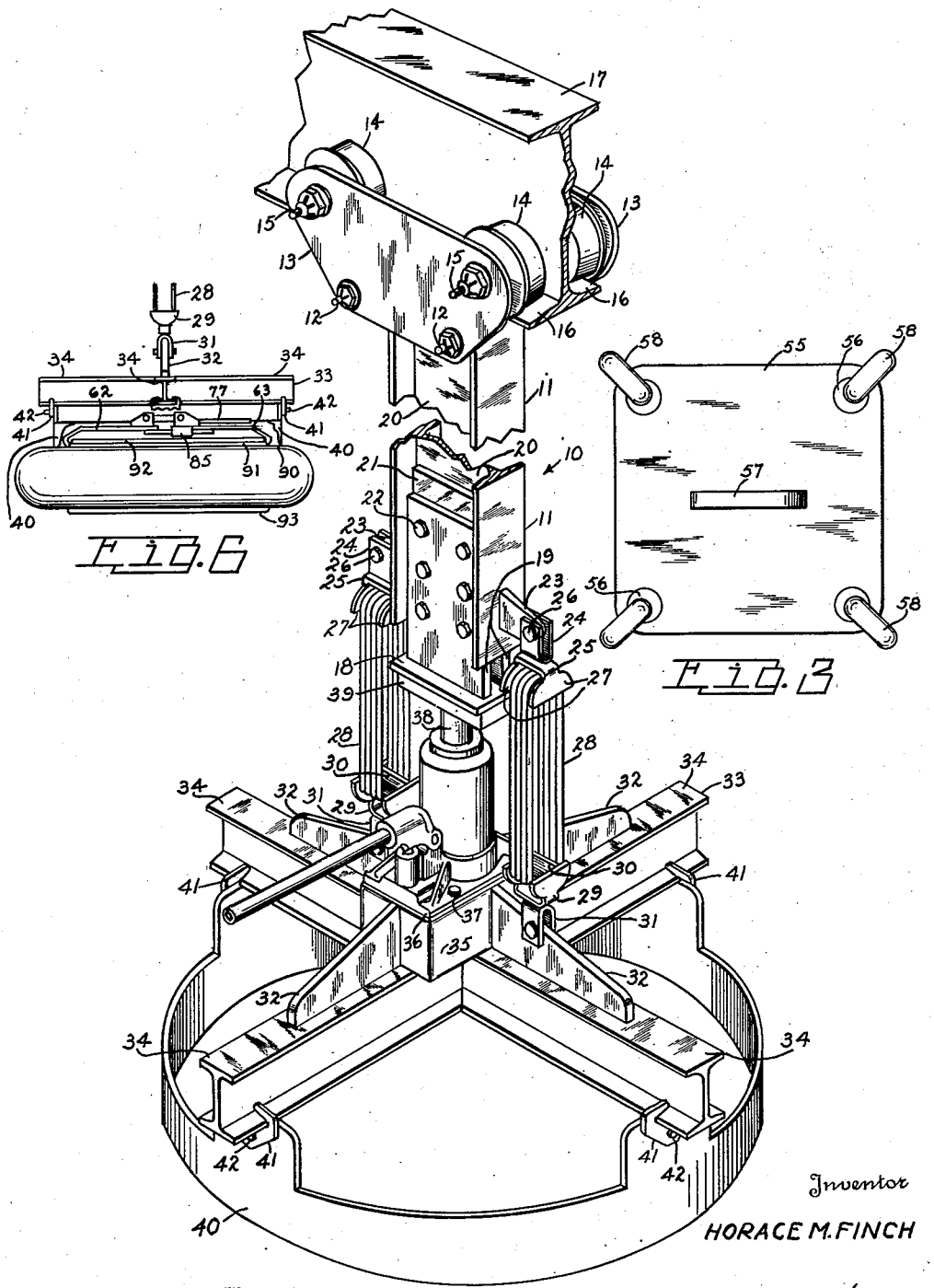
Inventor
HORACE M. FINCH

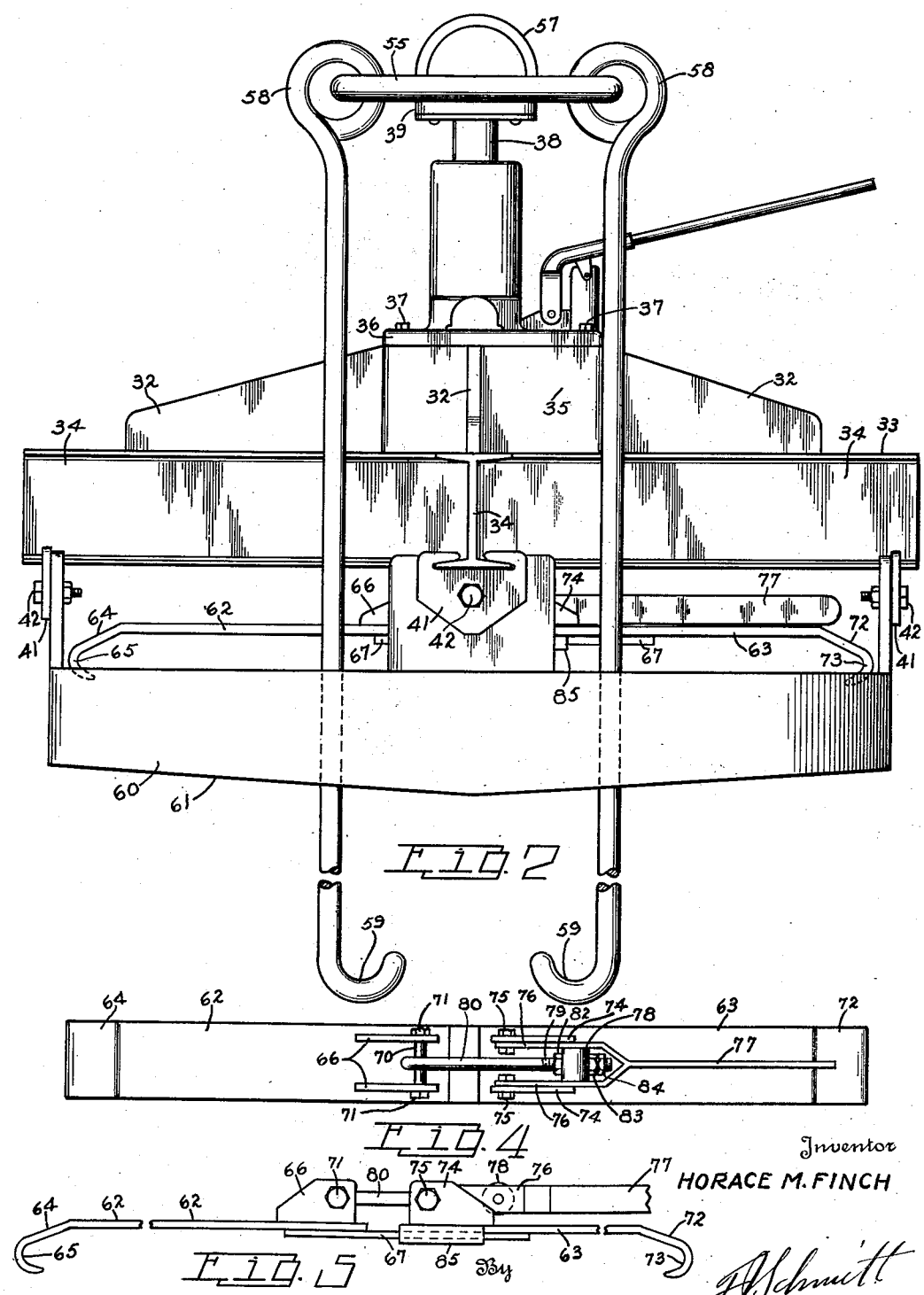

Patented Jan. 9, 1951

2,537,041

UNITED STATES PATENT OFFICE 2,537,041

HYDRAULIC JACK SUSPENDED TIRE REMOVER

Horace M. Finch, United States Navy

Application May 21, 1946, Serial No. 671,332

3 Claims. (Cl. 157—1.2)

(Granted under the act of March 3, 1883, as amended April 30, 1928; 370 O. G. 757)

The present invention relates to a tire remover and particularly to a hydraulic type of remover.

It is an object of the present invention to provide a hydraulic type tire remover that may be used in a base shop, or a portable type for use in the field.

Another object of the present invention is the provision of a tire remover device in which a press action is obtained to free the rims of a tire from the flanges of a wheel hub.

A still further object of the present invention is the provision of a tool for holding a floating bead and lock ring during a press operation.

A still further object of the present invention is the provision of means carried by the hydraulic remover for lifting the wheel out of a tire casing.

A still further object of the present invention is the provision of resilient retracting means.

A still further object of the present invention is the provision of means for receiving various size press rings.

Other objects and advantages of the invention will become apparent during the course of the following detailed description, when taken in connection with the accompanying drawings forming a part of this specification, and in which drawings:

Fig. 1 is a perspective view of a shop type hydraulic tire remover.

Fig. 2 is an elevational view of a field type hydraulic tire remover and illustrating the approximate position of a floating ring clamp.

Fig. 3 is a reduced top plan view of Fig. 2 illustrating the position of spoke engaging means.

Fig. 4 is a top plan view of the floating ring clamp.

Fig. 5 is a side elevational view of the floating ring clamp.

Fig. 6 is a reduced elevational view of the bridal and clamp in place on a tire, parts being shown fragmentarily and broken.

In the drawings Fig. 1 the numeral 10 represents a shop type hydraulic tire remover and it comprises an I-beam 11. To the upper end of the I-beam 11 there is secured by bolts 12 a pair of plates 13, and pivotally mounted to the plates 13 are flanged rollers 14 that are secured to the plate by bolts 15. The rollers 14 engage the flanges 16 of the I-beam monorail 17, the flanges 16 serving as a track-way. To the lower end of the I-beam 11 is secured a plate 18 having legs 19 that are in spaced relation and receive the web 20 of the I-beam 11 and a reinforcing plate 21. The legs 19 of the plate 18 and the reinforcing plate 21 are secured to the web 20 by bolts 22. The side walls of the I-beam 11 adjacent the lower end are provided with arms 23 that receive the U-shaped portion 24 of support brackets 25, the U-shaped portion 24 being fixedly secured to the arms 23 by bolts 26. The brackets 25 are provided with a semi-circular web (not shown) having semi-circular end plates 27 that are in spaced relation to each other. Trained around the semi-circular web of the brackets 25 are a plurality of resilient means 28 that may be of rubber or springs. In spaced relation below the brackets 25 are brackets 29 that are identical with the brackets 25 and these brackets are in reversed position to the brackets 25, the web 30 having the resilient means 28 trained therearound. The U-shaped portions 31 engage ribs 32 and they are secured thereto by bolts 33'.

The ribs 32 are part of a spider 33, the bridal comprising I-beams 34 disposed at right angles to each other forming extending arms. The ribs 32 may be integral with the elements 34 or they may be spot welded to the elements 34 if desired, the inner edges of the ribs being in spaced relation to each other forming an opening that receives a block 35 that may be secured to the ribs and elements 34 by any suitable means.

Mounted upon the block 35 is a hydraulic jack having a base 36 that is secured to the block 35 by bolts 37. The piston or ram 38 is provided with a plate 39 that is secured to the plate 18 by any suitable means. Below the spider 33 is a press ring 40 that is supported from the spider by bracket grips 41 that are secured to the press ring by bolts or pins 42. The spider is so designed that different diameter rings may be attached to the spider. The bracket grips 41 have a cut out portion conforming to the flanges of the arms 34, thus providing a means for using different diameter press rings.

In the field or portable type unit as illustrated in Fig. 2, the hydraulic jack and spider are identical with the jack and spider shown in the shop-type press shown in Fig. 1. To the plate 39 there is secured by any suitable means a plate 55 that is provided with apertures 56 and a bail 57. The apertures 56 receive the eye end 58 of hooks 59. A modified form of press ring 60 is shown secured to the spider 33, and this ring differs from ring 40 in that the lower peripheral edge 61 is of irregular configuration.

In Fig. 2 is shown the approximate position of the floating ring clamp illustrated in Figs. 4 and 5. The ring clamp comprises strap arms 62 and 63. The arm 62 has one end 64 formed into a hook 65 and on the top face of the arm is a pair of supports 66. The arm carries an extension 67, one end portion of which is integral therewith or secured by any suitable means to the bottom face of the arm 62 and the other end portion of which slides in a sleeve 85 secured to a support 74. Mounted between the supports 66 is a rod 70 that is secured by nuts 71, for a purpose to be later described. The arm 63 has one end 72 formed into a hook 73 to conform to the end portion of the strap 62, and on the top face of the arm 63 is a pair of supports 74. Mounted between the supports 74 and secured thereto by bolts 75 are legs 76 of a handle 77 and pivotally mounted between the legs 76 is an element 78. The element 78 is provided with a bore that receives the threaded end 79 of a shaft 80, the opposite end being connected to the rod 70. Adjustment of the arms 62 and 63 are made by the nuts 82, 83, and 84 on the threaded end 79. On the bottom face of the strap arm 63 is the guideway 85 that receives the extension 67.

In the use of the shop-type press as shown in Fig. 1, a wheel or hub having a tire thereon is placed flat on a floor with the floating bead ring and detachable flange face up, the bead ring and flange being well known in the art. The valve core of the inner tube of the tire is removed and the air allowed to escape. When the inner tube is deflated to approximately 5 pounds or less, the floating ring clamp is positioned over the tire, the ends 65 and 73 engaging the bead ring which has been adjusted to the diameter of the bead ring by the nuts 82, 83, and 84 on the rod 80. The ring clamp is locked by pushing the handle 77 to the position shown in Figs. 2 and 5. The press is then swung on the monorail to a position directly over the tire. The handle of the hydraulic jack is then moved up and down, the pumped fluid forcing the piston or ram 38 out of the chamber, and due to the plate 39 of the ram being secured to the plate 18 the ram housing moves downwardly forcing the spider and press ring 40 against the face of the tire 90 until the bead of the tire is released from the flange ring 91, the bead ring clamp holding the flange ring 91 and the locking ring 92 thus preventing them from slipping down on the hub of the wheel. During the downward movement of the spider the resilient elements 28 are expanded. After the tire has been loosened the tire press is moved to a neutral or disengaged position, the retraction of the press being expedited by contraction of the resilient elements 28. The ring clamp is next removed, then the bead ring 92 and flange ring 91 from the tire hub. The tire 90 is then turned over so that the other flange is face up, the press is again swung on the monorail to a position directly over the tire and the press operation repeated until the tire is loosened from the flange 93. The tire press is moved out of the way and a suitable cable spider (not shown) moved into position over the tire, the ends of the cables being connected to the hub or spokes of the wheel and a pull force exerted to the cable spider and the wheel or hub removed from the tire.

In the use of the form of invention shown in Fig. 2, the bail 57 is engaged by a bail hook that may be carried by any type of field vehicle having a boom and cable. The press is lowered over the tire, the hooks 59 being connected to spokes of a wheel upon which the tire is mounted. The modus operandi of the form of invention shown in Fig. 2 is the same as Fig. 1 and therefore it is believed unnecessary to repeat the operation. The difference in the two forms being that in Fig. 2 the hooks 59 pull the tire wheel up while the spider 33 moves the press ring 60 down, removing the tire from the wheel.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What is claimed is:

1. A hydraulic tire remover comprising a vertical column, rotative means on one end of said column, a track for receiving said rotative means and supporting said column, a hydraulic jack having one end connected to said column, means connected to and depending from the base of said jack, resilient means connected to said depending means and said column, means supported by said depending means for engaging a tire, said resilient means, depending means, and said tire engaging means being responsive to movement of said jack.

2. In a tire removing apparatus of the class described, a ring having an edge adapted to engage the bead portion of a tire casing of preselected size, a cross bar provided with lateral flanges and arranged adjacent an edge of said ring, a pair of elements at the end portions of said cross bar having wings shaped to receive said flanges slidably, and means for detachably securing said elements to said ring.

3. In tire removing apparatus for tire assemblies including flanged rims and bead rings, a tire compressing unit including a pressure ring adapted to overlie the tire about the bead ring and power means for forcing the pressure ring against the tire, and a bead ring clamp for holding the bead ring clamped to the rim flange during the tire compressing operation, said bead ring clamp comprising relatively slidable juxtaposed and axially aligned bars having hook ends adapted to engage and retain said bead ring.

HORACE M. FINCH.

REFERENCES CITED

The following references are of record in the file of this patent:

UNITED STATES PATENTS

| Number | Name | Date |
| --- | --- | --- |
| 1,466,430 | Flick | Aug. 28, 1923 |
| 1,605,462 | Peterson | Nov. 2, 1926 |
| 1,638,476 | Dalton | Aug. 9, 1927 |
| 1,890,746 | O'Dell | Dec. 13, 1932 |
| 2,375,956 | Smith et al. | May 15, 1945 |
| 2,387,839 | Frost | Oct. 30, 1945 |
| 2,404,583 | McCollister | July 23, 1946 |
| 2,406,996 | Colley | Sept. 3, 1946 |
| 2,418,849 | Polt | Apr. 15, 1947 |